L. J. GRAHAM.
SIGHT AND METHOD OF SIGHTING GUNS.
APPLICATION FILED MAY 9, 1917.
1,294,445.
Patented Feb. 18, 1919.
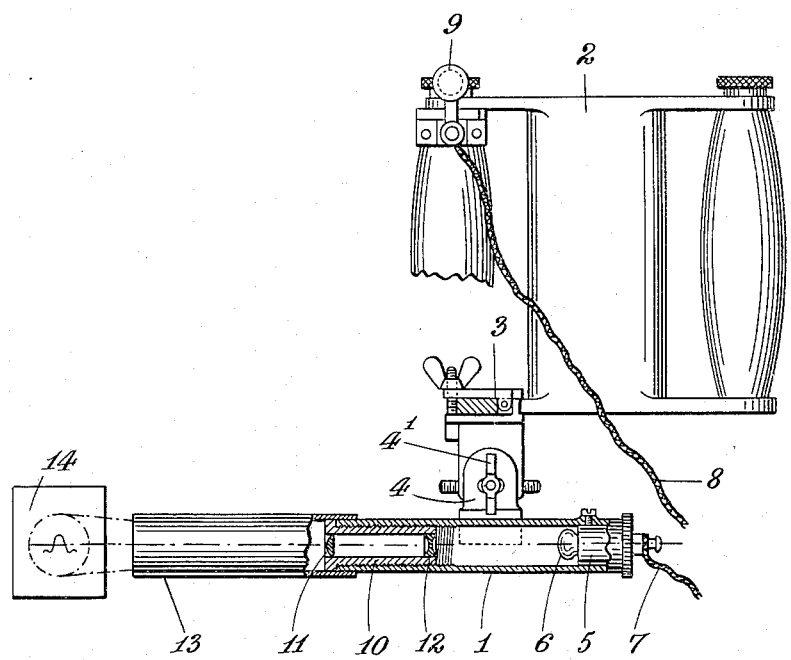
Lionel John Graham
Inventor
By [signature]
Attorney

UNITED STATES PATENT OFFICE.

LIONEL JOHN GRAHAM, OF LONDON, ENGLAND.

SIGHT AND METHOD OF SIGHTING GUNS.

1,294,445. Specification of Letters Patent. Patented Feb. 18, 1919.

Application filed May 9, 1917. Serial No. 167,589.

*To all whom it may concern:*

Be it known that I, LIONEL JOHN GRAHAM, a subject of the King of Great Britain, residing at London, England, have invented a new and useful Improvement Relating to Sights and Methods of Sighting Guns, of which the following is a specification.

This invention has reference to sights and methods of sighting guns and has for its object to provide improved means whereby the correct laying of a gun or small arm on a distant target may be accurately recorded upon a screen or chart so that when the gun and chart are thereafter caused to occupy the same relative positions firing may be effected—as for instance at night—with great accuracy of aim without the necessity of again aiming or sighting the gun on the distant target.

In its broadest aspect the invention contemplates a device adapted for attachment to a gun and having means whereby as the gun is laid a suitable source of illumination may be caused to project an appropriate image upon a screen or chart in such a manner that when once the correct position of the gun with respect to the distant target is obtained and the position of the projected image noted upon the screen or chart it is only necessary when the target can no longer be viewed—as at night for example—to so manipulate the gun that the image is projected on the screen or chart in the same position as that previously marked for great accuracy of aim to be obtained on the distant target.

In order that my invention may be readily understood and carried into effect I will now proceed to describe the same fully for which purpose reference is to be had to the accompanying drawing which illustrates a device constructed in accordance with this invention and shown as applied to the rear cross-piece of a machine gun.

In that embodiment of the invention illustrated 1 indicates a tube adapted for attachment to the rear cross piece 2 of the gun such as by means of the clamp 3 and joint 4 which latter permits of the tube 1 being turned and secured in any desired direction by means of the set screw 4¹.

The tube 1 carries at one end a plug 5 in which is mounted an electric incandescent glow lamp 6 in electrical connection with one terminal of an appropriate battery (not shown) by means of the lead 7 the other terminal of said battery being connected by the lead 8 to a switch 9 on the rear cross-piece 2.

The opposite end of the aforesaid tube 1 is provided with a focusing carrier 10 in which is mounted a single plano-convex lens 11 and a biconcave lens 12.

Slidably or otherwise conveniently mounted on the end of the tube 1 is a tubular ray shield 13 to prevent dispersion of the light-rays passing through the lenses 11 and 12 from the lamp 6.

In operation the gun is laid with correct range on the desired distant target when this latter is visible as for instance during the day and the beam of light from the lamp 6 caused to fall upon a screen or chart 14 suitably supported at an appropriate distance from the end of the tube 1. The image of the lamp filament will thus be projected upon the screen and its position is then marked thereon. Similar procedure is followed by any number of other targets and as the light is fixed on the gun the relation between the line of sight and the projected image is constant and it is therefore only necessary when it is desired to re-lay the gun at night to cause the beam of light to register with the previously marked position on the screen representing the target it is desired to hit to obtain great accuracy of aim.

To compensate for any allowance it may be necessary to make due to wind pressure or other conditions the aforesaid screen or chart may be so mounted as to be capable of adjustment in a vertical plane or otherwise.

In applying the invention to a small-arm it will obviously be necessary to provide a suitable support such as a tripod or other stand in which the weapon may be mounted the sighting device being clamped to the butt or other suitable part of the small-arm.

It will of course be apparent that instead of projecting the image of the lamp filament I may cause any other appropriate image to be projected upon the aforesaid screen for example cross wires may be mounted behind the lenses or a graticuled disk may be arranged within the tube or one of the lenses may be graticuled or the lamp bulb may bear an appropriate device or again a suitable slide may be interposed between the lamp and the lenses.

A device of the kind to which this invention relates possesses many manifest advantages as by its use a gun may be caused to cover the same field by night as by day while it eliminates the necessity of the firer understanding the methods of laying gun by map compass and clinometer which operation may be effected by a competent person and the various points registered on the screen after which anyone can open fire with effect upon any of the targets so registered.

I claim:

1. A device for sighting guns comprising means for projecting at any angle to the gun an appropriate image indicating the sighting and laying of the gun on the target and means for recording said projected image whereby the relaying and firing of the gun are performed without again visualizing the target.

2. A device for sighting guns comprising a source of illumination carried by the gun, means operable at any desired angle to the gun for focusing the beams from said source as the gun is laid on the target and a screen or chart for receiving and recording an appropriate image and adapted to serve in relaying and firing the gun without visualizing the target.

3. A device for sighting guns comprising a tube adapted for being turned and secured in any desired direction, a source of illumination and a lens mounted in said tube and a detached screen or chart adapted upon the laying of the gun on the target to receive and record the position of an appropriate image and to serve in re-laying and firing the gun without visualizing the target.

4. A device for sighting guns comprising a tube attached to the gun so as to be operable at any angle with regard thereto, a source of illumination and a focusing lens mounted in said tube, a ray shield carried by said tube and a screen or chart attached exteriorly and separately to and of the gun so that as the gun is laid on the target an image is projected on the said screen or chart in a line constant in relation to the line of sight of the gun and the said screen is adapted to serve in re-laying and firing the gun without visualizing the target.

LIONEL JOHN GRAHAM.